(12) United States Patent
Rawle

(10) Patent No.: US 8,301,332 B2
(45) Date of Patent: Oct. 30, 2012

(54) METHOD AND SYSTEM FOR FLEET OPERATIONS DATA MANAGEMENT

(75) Inventor: Walter Douglas Rawle, Clifton Park, NY (US)

(73) Assignee: GE Aviation Systems LLC, Grand Rapids, MI (US)

( * ) Notice: Subject to any disclaimer, the term of this patent is extended or adjusted under 35 U.S.C. 154(b) by 83 days.

(21) Appl. No.: 12/892,231

(22) Filed: Sep. 28, 2010

(65) Prior Publication Data

US 2012/0078459 A1 Mar. 29, 2012

(51) Int. Cl.
*G06F 7/00* (2006.01)

(52) U.S. Cl. .................................... 701/29.3; 701/400

(58) Field of Classification Search ............... 701/3, 14, 701/17, 29.3, 400; 340/945; 348/113
See application file for complete search history.

(56) References Cited

U.S. PATENT DOCUMENTS

| | | | |
|---|---|---|---|
| 6,148,179 A | 11/2000 | Wright et al. | |
| 6,160,998 A | 12/2000 | Wright et al. | |
| 6,167,239 A | 12/2000 | Wright et al. | |
| 6,173,159 B1 | 1/2001 | Wright et al. | |
| 6,353,734 B1 | 3/2002 | Wright et al. | |
| 6,915,189 B2 | 7/2005 | Igloi et al. | |
| 7,131,136 B2 * | 10/2006 | Monroe | 725/105 |
| RE40,479 E | 9/2008 | Wright et al. | |
| 2006/0190280 A1 | 8/2006 | Hoebel et al. | |
| 2008/0126111 A1 | 5/2008 | Loda | |
| 2008/0147264 A1 | 6/2008 | Doulatshahi et al. | |
| 2008/0208397 A1 | 8/2008 | Mikloa | |
| 2009/0326991 A1 | 12/2009 | Wei et al. | |
| 2010/0205021 A1 | 8/2010 | Jewett et al. | |

FOREIGN PATENT DOCUMENTS

| | | |
|---|---|---|
| EP | 1154388 A1 | 11/2001 |
| EP | 1560167 A2 | 8/2005 |
| WO | 2007067772 A2 | 6/2007 |

OTHER PUBLICATIONS

European Search Report and Search Opinion from corresponding EP Application No. 11182369.6, Feb. 2, 2012.

* cited by examiner

*Primary Examiner* — Yonel Beaulieu
(74) *Attorney, Agent, or Firm* — David J. Clement, Esq.; Armstrong Teasdale LLP

(57) ABSTRACT

A method and system for fleet operations data management is provided. The system includes a data collection and distribution network configured to distribute operations data to vehicles in a fleet of vehicles and collect vehicle performance data from the vehicles in the fleet of vehicles, the distributed operations data including at least one of travel plans, navigational databases, vehicle operator business data, and passenger information, the collected aircraft performance data including at least one of vehicle body integrity parameters, FADEC performance, CNS/ATM interoperability, and air computing infrastructure characteristics. The system further includes a plurality of wireless communications channels configured to transfer of data between a vehicle fleet operator and a fleet of vehicles, an adaptive, reconfigurable embedded instrument set configured to monitor variable aspects of individual aircraft performance, and a distributed control function configured to identify an appropriate communications channel for data transfer.

19 Claims, 2 Drawing Sheets

METHOD AND SYSTEM FOR FLEET OPERATIONS DATA MANAGEMENT

BACKGROUND OF THE INVENTION

The field of the invention relates generally to data communications, and more specifically, to a system and method of managing fleet operations data.

At least some known systems for communicating between a fleet of vehicles and a fleet operator provide only intermittent periods of communication or communication at data speeds that are not optimized for the location of the vehicles or the vehicles' current mode of operation. Typically, fleet communications systems rely on a single communication path for each vehicle mode of operation or phase of travel. Such systems may not be able to communicate all data available for transmission when the communication path is available and may not incorporate provisions for the adaptation and reconfiguration of data sources in response to available communications channels. Consequently, data may be lost or not timely transmitted to the fleet operator for appropriate action based on the data to be initiated.

BRIEF DESCRIPTION OF THE INVENTION

In one embodiment, a fleet operations data management system includes a data collection and distribution network configured to distribute operations data to vehicles in a fleet of vehicles and collect vehicle performance data from the vehicles in the fleet of vehicles, the distributed operations data including at least one of travel plans, navigational databases, vehicle operator business data, and passenger information, the collected aircraft performance data including at least one of vehicle body integrity parameters, FADEC performance, CNS/ATM interoperability, and air computing infrastructure characteristics. The system further includes a plurality of wireless communications channels configured to transfer of data between a vehicle fleet operator and a fleet of vehicles, an adaptive, reconfigurable embedded instrument set configured to monitor variable aspects of individual aircraft performance, and a distributed control function configured to identify an appropriate communications channel for data transfer.

In another embodiment, a method of managing fleet operations data includes receiving vehicle position information and vehicle route phase information for the fleet for a plurality of vehicles in a fleet of vehicles, determining based on the received information and at least one of an event response, a command from a respective one of the plurality of vehicles and a command from a fleet operations terminal an optimal communications channel for data transfer between the respective vehicle and the fleet operations terminal, and transmitting at least one of vehicle performance data and operations data between the plurality of vehicles and the fleet operations terminal using at least one of a first relatively high bandwidth digital communications, a second relatively narrow bandwidth digital communications channel, and a combination thereof selected based on the received information.

BRIEF DESCRIPTION OF THE DRAWINGS

FIG. 1 is a schematic block diagram of a fleet operations data management system in accordance with an exemplary embodiment of the present invention; and FIG. 2 is a flow diagram of a method of managing fleet operations data.

DETAILED DESCRIPTION OF THE INVENTION

The following detailed description illustrates embodiments of the invention by way of example and not by way of limitation. It is contemplated that the invention has general application to analytical and methodical embodiments of facilitating operational data transfer in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention described below reduces a limit on the transmission of operations data: flight plans, navigational data, air carrier business data, and passenger information, to a vehicle fleet and also reduces limits on the transmission of maintenance and performance data: airframe integrity, FADEC performance metrics, CNS/ATM operability, and on board computer infrastructure parameters, from an aircraft fleet to its operations center. Embodiments of the present invention provide a diverse collection of assets from which an optimum communications channel is established for a particular application.

Embodiments of the present invention incorporate provisions for the adaptation and reconfiguration of data sources in response to available communications channels. For data transfer to the fleet, conventions are provided for modifying data formats for navigational data, air carrier business data, or passenger information. For data transfer from the fleet, conventions are provided for incorporating adaptive, embedded instrumentation that may be reconfigured for the optimal transmission of maintenance data to the operator through available communications channels.

Embodiments of the present invention incorporate provisions for the aggregation of data and/or the extraction of knowledge that may be of use to the fleet operator. For knowledge transfer to a fleet, an operator may wish to aggregate updated scheduling information for optimized fleet route re-assignment. For knowledge transfer from the fleet, aggregated maintenance data may be used, during preventative maintenance exercises, to identify and correct otherwise unknown potential failure mechanisms.

Figure 1:
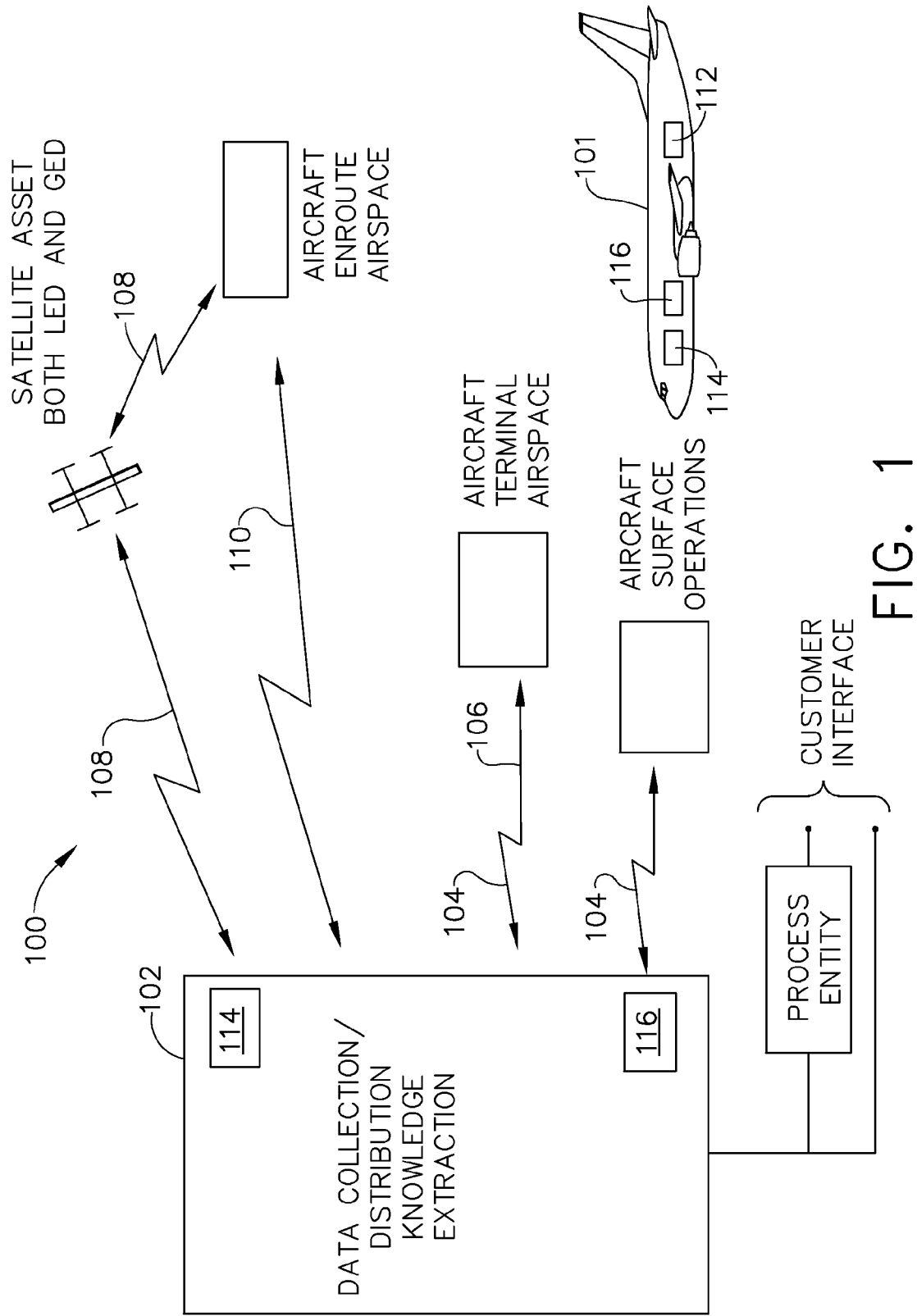
FIGS. 1-2 show exemplary embodiments of the method and system described herein.

FIG. 1 is a schematic block diagram of a fleet operations data management system 100 in accordance with an exemplary embodiment of the present invention. Fleet operations data management system 100 provides a comprehensive capability for the management and bi-directional transfer of operations data from a service operator to a fleet of vehicles. In the exemplary embodiment, fleet operations data management system 100 provides a comprehensive capability for the management and bi-directional transfer of operations data from an air service operator to a fleet of aircraft 101. Fleet operations data management system 100 includes a data collection and distribution network 102 with embedded knowledge generation and extraction ability, a plurality of wireless communications channels 104, 106, 108, and 110 for the transfer of data between the air service operator and the aircraft fleet, an adaptive, reconfigurable embedded instrumentation set 112 that is used to monitor variable aspects of individual aircraft performance, and a distributed control function 114, which identifies the appropriate communications channel for data transfer.

Data collection and distribution network 102 provides the capability to distribute operations data to the aircraft fleet and collect aircraft performance data. The operations data to be distributed includes, but is not limited to, flight plans, navigational databases, air operator business data, and passenger information and entertainment. The aircraft performance data to be collected includes, but is not limited to, airframe integrity parameters, FADEC performance, CNS/ATM interoperability, and air computing infrastructure characteristics. In response to available communications capacity, a data collection and distribution network control entity may tailor or compress operations data directed towards the aircraft fleet. The data collection and distribution network control entity receives aircraft fleet data and aggregates this data for the purpose of knowledge extraction. The knowledge filtered from the fleet data may be used to assess overall fleet health and performance. Specific performance parameters may include, but are not limited to, fleet wide fuel efficiency, structural integrity, failure identification, preventative maintenance indication, and schedule deviation. Data collection and distribution network 102 incorporates a process entity that performs customized manipulation of aircraft fleet data that provides added value to an aviation customer base. Data collection and distribution network 102 may be implemented via Internet or other proprietary network infrastructure. The control and process entities may be implemented on commercially available or propriety computing infrastructures.

In the exemplary embodiment, fleet operations data management system 100 employs four wireless communications channels. In various embodiments, more channels may be used. The wireless communications channels may be used individually or in combination to provide bandwidth sufficient for appropriate data transfer.

Wireless link #1 includes a subscriber, ground based, high bandwidth digital communications channel. This communications channel employs modulation formats that support data transfer rates greater than 1 bit/Hz. Examples of such modulation formats include Orthogonal Frequency Division Multiplex (OFDM) and 256QAM (Quadrature Amplitude Modulation). The 802.16 WiMAX industry standard supports this modulation format. Wireless link #1 is employed for aircraft ground operations.

Wireless link #2 includes a non-subscriber based aeronautical telemetry high bandwidth digital communications channel. This communications channel employs modulation formats that support data transfer rates greater than 1 bit/Hz and that are defined by international convention. Examples of such modulation formats include Inter Range Instrumentation Group (TRIG), standard Shaped Offset Quadrature Phase Shift Keying (SOQPSK), and Advanced Range Telemetry Continuous Phase Modulation (ARTM CPM). Wireless link #2 is employed for aircraft operations in a terminal control area and is most suitable for data transfers requiring data rates exceeding 50 Mb/s.

Wireless link #3 includes a subscriber based, satellite, narrow bandwidth digital communications channel. The modulation formats employed for this service are established by international convention and support data transfers of 100 Kb/s. Wireless link #3 is employed for aircraft enroute operations, providing an essential service for transoceanic flight paths.

Wireless line #4 is comprised of a subscriber based, VHF narrow bandwidth digital communications channel. The modulation formats established for this service are established by international convention and Aeronautical Radio Inc. (ARINC). Wireless line #4 is employed for aircraft enroute operations and provides an essential minimum data transfer capability when other services are not available.

Fleet operations data management system 100 also includes adaptive, reconfigurable instrumentation set 112, installed on each aircraft 101 of the fleet. Instrumentation set 112 tailors and filters aircraft performance data acquisition and capture in response to available communications infrastructure. As defined by system configuration, instrumentation set 112 samples aircraft performance parameters at a rate consistent with both available communications infrastructure and phase of flight. For example, for terminal operations, instrumentation set 112 samples performance parameters at high sample rates for on aircraft storage or for high data rate transfer to data collection and distribution network 102. For enroute operations, instrumentation set 112 samples performance parameters at a low sample rate for on aircraft storage or for low data rate transfer to data collection and distribution network 102. Instrumentation set 112 may be re-configured via flight deck and ground command and may be adaptively re-configured via event response.

Distributed control function 114 gathers position and flight phase information for the aircraft fleet and employs this information to determine the optimum communications channel for data transfer. Specifically, for a collection of aircraft operating at various physical locations and in various phases of flight-ground operations, terminal, and enroute, distribution control function 114 determines the appropriate communications channel for data transfer with each of these aircraft. Elements of distributed control function 114 are installed in both data collection and distribution network 102 and aircraft 101 of the fleet. Data collection and distribution network 102 provides input to distributed control function 114 from flight plans, route tables, meteorological reports, terminal and enroute advisories, and air operator business data. Aircraft 101 provide inputs to distributed control function 114 from on-board flight management systems. Many of the functions described herein may be performed by one or more processors 116.

Figure 2:
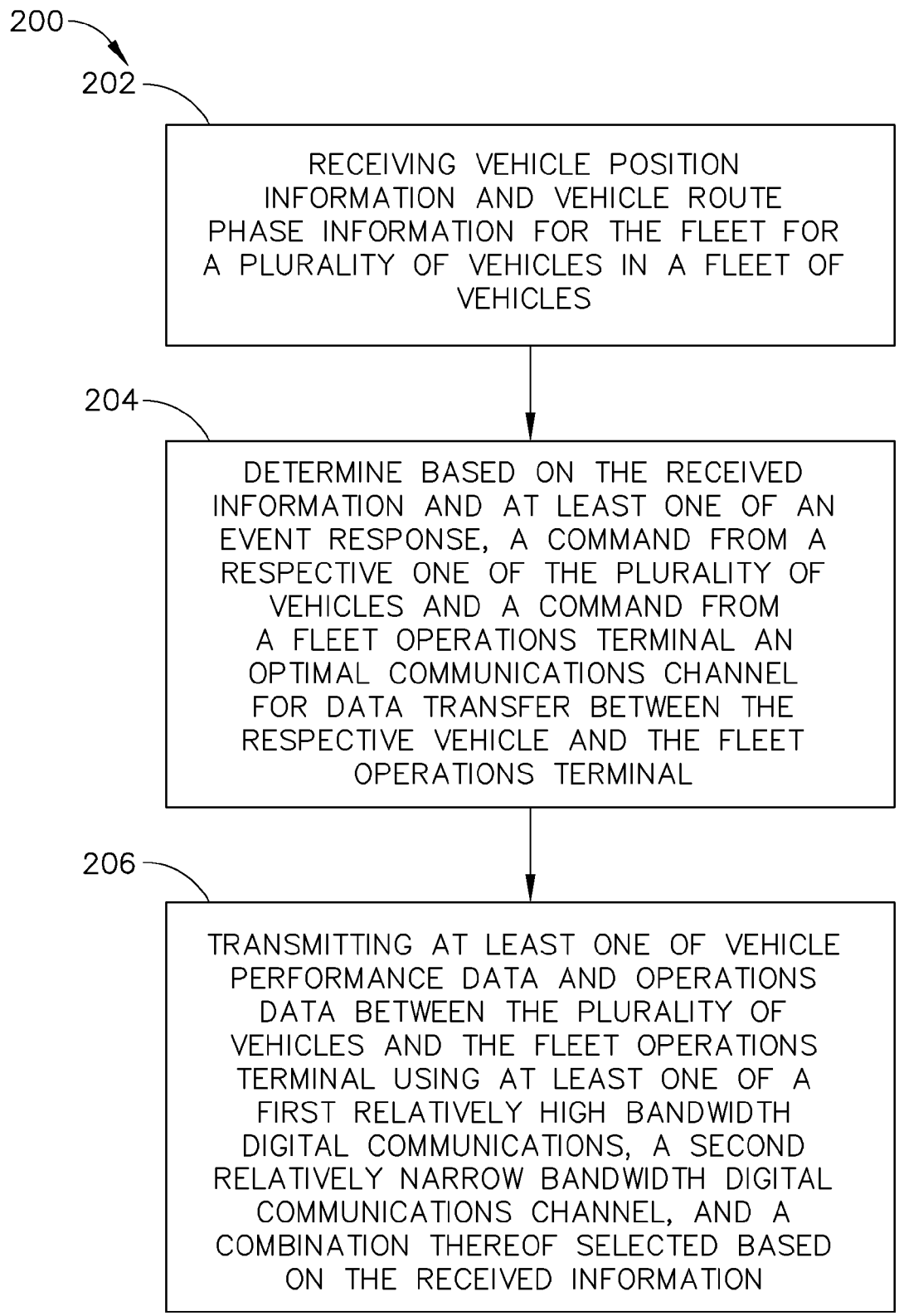

FIG. 2 is a flow diagram of a method 200 of managing fleet operations data. In the exemplary embodiment, method 200 includes receiving 202 vehicle position information and vehicle route phase information for the fleet for a plurality of vehicles in a fleet of vehicles, determining 204 based on the received information and at least one of an event response, a command from a respective one of the plurality of vehicles and a command from a fleet operations terminal an optimal communications channel for data transfer between the respective vehicle and the fleet operations terminal, and transmitting 206 at least one of vehicle performance data and operations data between the plurality of vehicles and the fleet operations terminal using at least one of a first relatively high bandwidth digital communications, a second relatively narrow bandwidth digital communications channel, and a combination thereof selected based on the received information.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 116, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is an adaptation and reconfiguration of data sources in response to available communications channels and for the aggregation of data and/or the extraction of knowledge that may be of use to the fleet operator. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of fleet operations data management provides a cost-effective and reliable means for providing significant improvement to and needed functionality for the management of vehicle fleet operations data in, for example, the commercial aviation industry. As a result, the method and system described herein facilitate automatically determining a communications infrastructure to be used for data transmission based on a vehicle position and operating mode in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A fleet operations data management system comprising:
    a data collection and distribution network configured to distribute operations data to vehicles or aircrafts in a fleet of vehicles or aircrafts and collect vehicle or aircraft performance data from the vehicles in the fleet of vehicles, the distributed operations data including at least one of travel plans, navigational databases, vehicle operator business data, and passenger information, the collected aircraft performance data including at least one of vehicle body integrity parameters, FADEC performance, CNS/ATM interoperability, and air computing infrastructure characteristics;
    a plurality of wireless communications channels configured to transfer of data between a vehicle fleet operator and a fleet of vehicles;
    an adaptive, reconfigurable embedded instrumentation set configured to monitor variable aspects of individual aircraft performance, said instrumentation set is positioned on at least some vehicles of the fleet of vehicles, said instrumentation set configured to filter vehicle performance data acquisition in response to an available communications infrastructure, said instrumentation set is further configured to sample vehicle performance parameters at a rate based on the available communications infrastructure and a phase of travel of the vehicle; and
    a distributed control function configured to identify an appropriate communications channel for data transfer.

2. A system in accordance with claim 1, wherein said data collection and distribution network is configured to compress operations data directed towards the vehicles in the fleet in response to available communications capacity.

3. A system in accordance with claim 1, wherein said data collection and distribution network is configured to receive fleet data and aggregate the received data for knowledge extraction.

4. A system in accordance with claim 1, wherein said data collection and distribution network is configured to assess overall fleet health and performance using at least one of a fleet wide fuel efficiency, a vehicle structural integrity, a vehicle system failure identification, a vehicle preventative maintenance indication, and a vehicle operational schedule deviation.

5. A system in accordance with claim 1, wherein said data collection and distribution network further comprises a process entity configured to perform customized manipulation of vehicle fleet data according to customer specified requirements.

6. A system in accordance with claim 1, wherein said plurality of wireless communications channels includes a first subscriber, ground based, high bandwidth digital communications channel employed for vehicle ground operations, a second non subscriber based aeronautical telemetry high bandwidth digital communications channel employed for aircraft operations in a terminal control area, a third subscriber based, satellite, narrow bandwidth digital communications channel employed for aircraft enroute operations, and a fourth subscriber based, VHF narrow bandwidth digital communications channel employed for aircraft enroute operations.

7. A system in accordance with claim 1, wherein said instrumentation set is configured to sample performance parameters at a relatively high sample rate for at least one of on-vehicle storage and transfer to said data collection and distribution network during a terminal operation mode.

8. A system in accordance with claim 1, wherein said instrumentation set is configured to sample performance parameters at a relatively low sample rate for at least one of on-vehicle storage and transfer to said data collection and distribution network during an enroute operation mode.

9. A system in accordance with claim 1, wherein said instrumentation set is reconfigurable via at least one of a command from the vehicle and a command from a fleet operations terminal.

10. A system in accordance with claim 1, wherein said instrumentation set is adaptively reconfigurable via an event response.

11. A system in accordance with claim 1, wherein said distributed control function is configured to:
    gather vehicle position information and vehicle route phase information for the fleet; and
    determine the optimum communications channel for data transfer using the gathered information.

12. A system in accordance with claim 1, wherein said distributed control function, for a fleet of vehicles each vehicle operating at a plurality physical locations and in a plurality of possible phases of travel and modes of operation including terminal and enroute, is configured to determine the appropriate communications channel for data transfer with each of the vehicles.

13. A system in accordance with claim 1, wherein elements of said distributed control function are positioned in data collection and distribution network and said plurality of vehicles of the fleet.

14. A system in accordance with claim 1, wherein said data collection and distribution network provides input to said distributed control function from at least one of flight plans, route tables, meteorological reports, terminal and enroute advisories, and fleet operator business data.

15. A system in accordance with claim 1, wherein said vehicle provides inputs to said distributed control function from on board vehicle management systems.

16. A method of managing fleet operations data comprising:
receiving vehicle position information and vehicle route phase information for the fleet for a plurality of vehicles in a fleet of vehicles;
determining based on the received information and at least one of an event response, a command from a respective one of the plurality of vehicles and a command from a fleet operations terminal an optimal communications channel for data transfer between the respective vehicle and the fleet operations terminal; and
transmitting at least one of vehicle performance data and operations data between the plurality of vehicles and the fleet operations terminal using at least one of a first relatively high bandwidth digital communications channel and a second relatively narrow bandwidth digital communications channel, the communications channel selected based on the received information.

17. A method in accordance with claim 16 wherein the operations data includes at least one of travel plans, navigational databases, vehicle operator business data, and passenger information and the vehicle performance data includes at least one of vehicle body integrity parameters, FADEC performance, CNS/ATM interoperability, and air computing infrastructure characteristics.

18. A method in accordance with claim 16 further comprising compressing the operations data in response to an available communications capacity.

19. A method in accordance with claim 16 further comprising aggregating the vehicle performance data for knowledge extraction.

* * * * *